United States Patent
Eble et al.

(10) Patent No.: US 8,118,539 B2
(45) Date of Patent: Feb. 21, 2012

(54) EXHAUST GAS TURBOCHARGER FOR A MOTOR VEHICLE

(75) Inventors: Markus Eble, Stuttgart (DE); Andreas Wengert, Auenwald (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 399 days.

(21) Appl. No.: 12/412,003

(22) Filed: Mar. 26, 2009

(65) Prior Publication Data

US 2009/0246005 A1  Oct. 1, 2009

(30) Foreign Application Priority Data

Mar. 27, 2008  (DE) .......................... 10 2008 000 852

(51) Int. Cl.
*F04D 31/00* (2006.01)
(52) U.S. Cl. .......... 415/116; 415/134; 415/160; 60/611; 60/602; 60/605.1
(58) Field of Classification Search .................. 415/160, 415/116, 134, 157, 158, 169.1, 169.2, 205, 415/206; 60/602, 605, 611
See application file for complete search history.

(56) References Cited

U.S. PATENT DOCUMENTS

| | | | |
|---|---|---|---|
| 6,536,214 B2* | 3/2003 | Finger et al. | 60/602 |
| 6,857,468 B2* | 2/2005 | Emrich | 165/125 |
| 7,937,941 B2* | 5/2011 | Nau et al. | 60/605.1 |
| 2006/0062663 A1* | 3/2006 | Figura et al. | 415/160 |
| 2006/0248888 A1* | 11/2006 | Geskes | 60/599 |

* cited by examiner

*Primary Examiner* — David Nhu
(74) *Attorney, Agent, or Firm* — Rader, Fishman & Grauer PLLC

(57) ABSTRACT

The present disclosure relates to an exhaust gas turbocharger for a motor vehicle. The turbocharger includes a turbine housing having a first area in which exhaust is carried to a turbine wheel and in which the turbine wheel is essentially situated and having a second area connected axially to the first area, such that the first area and the second area are essentially separated from one another by a separating element. It is provided that for thermal insulation, the separating element is made of a material having a low thermal conduction and/or thermal capacity.

20 Claims, 1 Drawing Sheet

EXHAUST GAS TURBOCHARGER FOR A MOTOR VEHICLE

CROSS-REFERENCES TO RELATED APPLICATION

This application claims priority to German patent application DE 10 2008 000 852.4 filed on Mar. 27, 2008, which is hereby incorporated by reference in its entirety.

DESCRIPTION

The present invention relates to an exhaust gas turbocharger for a motor vehicle, comprising a turbine housing having a first area in which exhaust gas is carried to a turbine wheel and in which the turbine wheel is essentially situated, and having a second area which follows the first area axially such that the first area and the second area are essentially separated from one another by means of a separating element.

BACKGROUND INFORMATION

To increase the performance of internal combustion engines in motor vehicles, it is known that exhaust gas turbochargers are to be used. Exhaust gas from the internal combustion engine is supplied to a turbine wheel mounted in a turbine housing. The turbine wheel is mounted on a shaft on which a compressor wheel of a compressor is mounted in a rotationally fixed manner at an axial distance from the turbine wheel. As a rule, the turbine housing has at least two areas, a first area of which serves to supply exhaust gas to the turbine wheel and a second area serves to hold an adjustment mimicking mechanism of a guide vane arrangement with an adjustable turbine geometry and/or to hold a bearing for the shaft. The areas are separated from one another by a separating element, which serves in the prior art to center a cassette, for example, which holds the guide vane arrangement of the variable turbine geometry. The separating element here is designed as a disk and is arranged behind from the turbine wheel (in the axial direction toward the compressor). During operation of the exhaust gas turbocharger, the turbine wheel reaches temperatures of 900° C. in conventional diesel internal combustion engines and up to 1110° C. in conventional gasoline engines. In this way, the separating element is subject to a substantial thermal burden on the one hand, while on the other hand, a substantial quantity of heat is input into the turbine housing and/or into the second area via the separating element.

The object of the present invention is to provide an exhaust gas turbocharger for a motor vehicle that avoids the aforementioned disadvantages.

SUMMARY OF THE INVENTION

An exhaust gas turbocharger for a motor vehicle is proposed here, comprising a turbine housing having a first area in which exhaust gas is supplied to a turbine wheel, in which the turbine wheel is essentially situated and which has a second area connected to the first area axially, such that the first area and the second area are separated from one another essentially by a separating element. It is proposed that the separating element for thermal insulation should be made of a material having a low thermal conduction and/or thermal capacity. This achieves the result that unlike arrangements known in the prior art in which the separating element is made of a metal, in particular steel, the separating element, does not deliver the thermal energy absorbed by the hot exhaust gas and/or by the hot turbine wheel to the elements acted upon or adjacent thereto, e.g., the turbine housing, not by direct thermal conduction or by radiant emission after absorbing heat itself (because the thermal capacity should be low according to the present invention). The separating element consequently effectively prevents a transfer of heat from the first area into the second area and/or into areas which are acted upon by the separating element and are not directly acted upon by the hot exhaust gas or are in direct proximity to the hot turbine wheel.

The separating element is preferably made of ceramic. Ceramic is a known insulation material and has a very high heat resistance but can also be manufactured industrially very advantageously in mass production.

In another embodiment, the separating element is preferably made of a carbon fiber material (CFK, carbon fiber-reinforced material). This material also allows a very good thermal insulation with a high strength.

In both variants, i.e., in the ceramic embodiment or the CFK embodiment, for example, the thermal expansion can be adjusted through a suitable choice of materials of the separating element, i.e., adjustment of the respective material parameters, as well as the surrounding components, e.g., the turbine housing. This achieves the result that the thermal behavior of the bearing housing, for example, does not deviate from that of the separating element to such an extent that unwanted phenomena must be expected because of differences in thermal expansion during operation.

In another embodiment, the separating element is inserted into a bearing element. The bearing element here is, for example, a bearing that serves to support the separating element, i.e., to hold it so that it does not come in direct contact with the turbine housing.

The separating element is preferably inserted into a receptacle in the bearing element, i.e., a receptacle or geometric arrangement which allows the introduction of the separating element. The bearing element may in turn create a plurality of (additional) bearings, e.g., that of the shaft, that of the separating element or other elements of the exhaust gas turbocharger, or it may be dedicated entirely to just the bearing of the separating element.

In another embodiment, the separating element is forced by means of at least one spring into the receptacle of the bearing element. In order for the separating element to remain secured in the receptacle of the bearing element after being introduced into the desired position, it is provided that a spring force acts, such that the spring is supported on the separating element on one end and on a suitable supporting surface on the other end, so that the separating element remains held in the receptacle by the spring force.

The spring is especially preferably a plate spring. A plate spring can be designed in a ring, e.g., in a design that saves on design space in particular and can be accommodated between the bearing element and the variable turbine geometry in the design space.

It is preferably provided that the spring is supported on the separating element on one end and on a bearing housing for supporting the turbine wheel on the other end. Consequently, the turbine wheel has a bearing housing into which a shaft bearing, for example, is introduced for its support. This bearing housing has supporting surfaces on which the spring is supported on the one end while it is also supported on the separating element on the other end and thus its spring force acts between the supporting surfaces on the bearing housing and the separating element.

Additional advantageous embodiments are derived from the dependent claims and from combinations thereof; FIG. 1 shows details.

BRIEF DESCRIPTION OF THE DRAWINGS

The present invention is described in greater detail below on the basis of one exemplary embodiment although it is not limited to that.

EMBODIMENT(S) OF THE INVENTION

Figure 1:
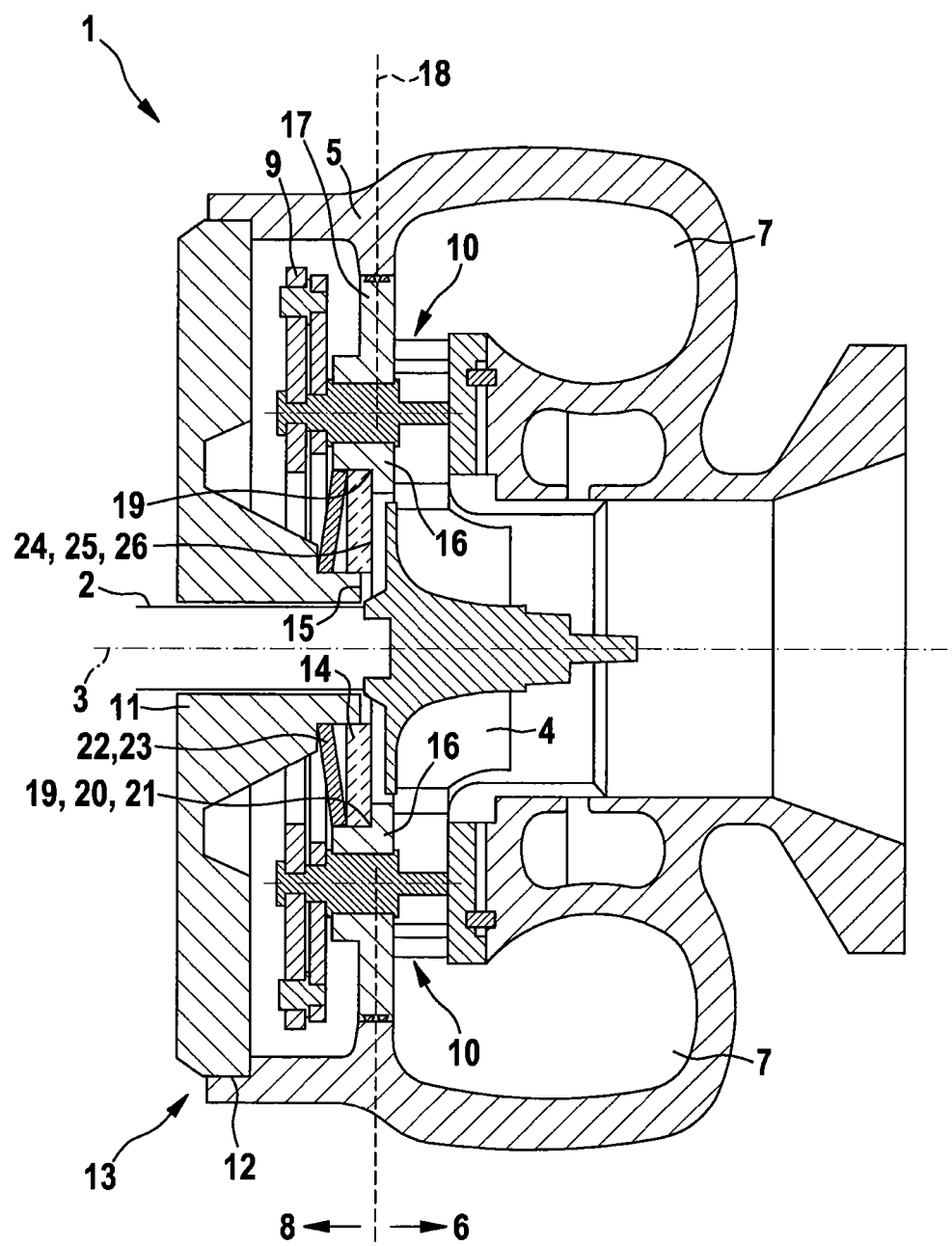
FIG. 1 shows a section at the height of the shaft through a turbine housing of an exhaust gas turbocharger with the separating element inserted.

FIG. 1 shows an exhaust gas turbocharger 1 for an internal combustion engine (not shown) of a motor vehicle (not shown) in an axial sectional view at the level of a shaft 2, namely at the level of a turbine axis 3 of a turbine wheel 4. The exhaust gas turbocharger 1 has a turbine housing 5, in the first area 6 of which exhaust gas is carried to the turbine wheel 4, in which the exhaust gas guides 7 introduced into the turbine housing 5 for the oncoming flow of exhaust gas to the turbine wheel 4 run, and in which the turbine wheel 4 is essentially arranged. The turbine housing 5 also has a second area 8, which is connected axially to the first area and in which a control mimicking mechanism 9 is provided for controlling a variable turbine geometry 10 such that the variable turbine geometry 10 is arranged in the first area 6 and produces the oncoming flow to the turbine wheel 4 with the exhaust gas entering from the exhaust gas guide 7. A bearing housing 11 is also situated in the second area 8 for support of the shaft 2 and the turbine wheel 4, which is in turn supported in the manner of a cover in an internal circumferential area 12 of an end face 13 of the turbine housing 5 and through which the shaft 2 passes. Between the bearing housing 11 and the turbine wheel 4 is provided a separating element 14 which is exposed to an axial end face 15 of the bearing housing 11, which faces the turbine wheel 4 on the outside circumference and is in turn supported in a bearing element 16 of a cover plate 17 of the variable turbine geometry 10 in the dividing plane 18 between the first area 6 and the second area 8. The bearing element 16 is designed in the form of a ring and surrounds the turbine wheel 4 at one end. It has a receptacle 19 in the form of a peripheral bearing edge 20 with a ring-shaped recess (having essentially an L shape 21 in cross section), such that the receptacle is open with respect to the bearing housing 11, whereas it is designed to be closed with respect to the turbine wheel 4. The separating element 14 is situated in the L shape 21 of the receptacle 19, where it is held by a spring 22, namely a plate spring 23, which is in turn supported on the separating element 14 at one end and on the bearing housing 11 on the other end. The separating element 14 here is made of a material having a low thermal conduction 24, in particular ceramic 25 or a carbon fiber material 26 (CFK). In this way, a heat transfer from the first area 6 to the second area 8 with an oncoming flow of hot exhaust gases to the turbine wheel 4 and/or from the turbine wheel 4 is very effectively reduced or largely prevented with only short-term operation. At the same time, this prevents an unwanted transfer of heat to the bearing housing 11.

The invention claimed is:

1. An exhaust gas turbocharger for a motor vehicle, comprising:
    a turbine wheel;
    a separating element;
    a turbine housing having a first area, in which exhaust is carried to the turbine wheel and in which the turbine wheel is essentially arranged, and having a second area connected axially to the first area such that the first area and the second area are separated from one another by the separating element; and
    wherein the separating element is constructed from a material including at least one of a low thermal expansion and a thermal capacity for thermal insulation such that the separating element reduces heat transfer from the first area to at least one of the second area and the turbine wheel.

2. The exhaust gas turbocharger as recited in claim 1, wherein the separating element is constructed from a ceramic based material.

3. The exhaust gas turbocharger as recited in claim 1, wherein the separating element constructed from of a carbon fiber material based material (CFK).

4. The exhaust gas turbocharger as recited in claim 1, wherein the separating element is inserted into a bearing element.

5. The exhaust gas turbocharger as recited in claim 1, wherein the separating element is inserted into a receptacle of a bearing element.

6. The exhaust gas turbocharger as recited in claim 1, wherein the separating element is forced by at least one spring into a receptacle of a bearing element.

7. The exhaust gas turbocharger as recited in claim 6, wherein the spring is a plate spring.

8. The exhaust gas turbocharger as recited in claim 6, wherein the spring is supported at one end on the separating element and at the other end on a bearing housing for supporting the turbine wheel.

9. The exhaust gas turbocharger as recited in claim 2, wherein the separating element is inserted into a bearing element.

10. The exhaust gas turbocharger as recited in claim 2, wherein the separating element is inserted into a receptacle of a bearing element.

11. The exhaust gas turbocharger as recited in claim 2, wherein the separating element is forced by at least one spring into a receptacle of a bearing element.

12. The exhaust gas turbocharger as recited in claim 11, wherein the spring is a plate spring.

13. The exhaust gas turbocharger as recited in claim 11, wherein the spring is supported at one end on the separating element and at the other end on a bearing housing for supporting the turbine wheel.

14. The exhaust gas turbocharger as recited in claim 3, wherein the separating element is inserted into a bearing element.

15. The exhaust gas turbocharger as recited in claim 3, wherein the separating element is inserted into a receptacle of a bearing element.

16. The exhaust gas turbocharger as recited in claim 3, wherein the separating element is forced by at least one spring into a receptacle of a bearing element.

17. The exhaust gas turbocharger as recited in claim 16, wherein the spring is a plate spring.

18. The exhaust gas turbocharger as recited in claim 16, wherein the spring is supported at one end on the separating element and at the other end on a bearing housing for supporting the turbine wheel.

19. The exhaust gas turbocharger as recited in claim 4, wherein the separating element is inserted into a receptacle of a bearing element.

20. The exhaust gas turbocharger as recited in claim 4, wherein the separating element is forced by at least one spring into a receptacle of a bearing element.

* * * * *